United States Patent
Noda

(10) Patent No.: US 9,949,466 B2
(45) Date of Patent: Apr. 24, 2018

(54) FISHING ROD

(71) Applicant: Globeride, Inc., Tokyo (JP)

(72) Inventor: Takahito Noda, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 14/584,323

(22) Filed: Dec. 29, 2014

(65) Prior Publication Data

US 2015/0181850 A1    Jul. 2, 2015

(30) Foreign Application Priority Data

Dec. 27, 2013 (JP) ................. 2013-272429

(51) Int. Cl.
*A01K 87/00* (2006.01)

(52) U.S. Cl.
CPC ................... *A01K 87/00* (2013.01)

(58) Field of Classification Search
CPC ............... A01K 87/00; A01K 87/01
USPC .................................. 43/18.1 R–26
See application file for complete search history.

(56) References Cited

U.S. PATENT DOCUMENTS

| | | | |
|---|---|---|---|
| 2,749,643 A | 6/1956 | Scott | |
| 3,461,593 A | 8/1969 | Martuch | |
| 3,953,637 A * | 4/1976 | Phillips | A01K 87/00 43/18.1 R |
| 4,015,360 A | 4/1977 | Herter | |
| 4,070,127 A | 1/1978 | Loomis | |
| 4,083,140 A | 4/1978 | Van Auken | |
| 4,157,181 A | 6/1979 | Cecka | |
| 4,178,713 A | 12/1979 | Higuchi | |
| 4,468,270 A | 8/1984 | Green | |
| 4,653,216 A | 3/1987 | Inoue | |
| 4,685,241 A | 8/1987 | Foote et al. | |
| 4,759,147 A | 7/1988 | Pirazzini | |
| 4,860,481 A | 8/1989 | Christenson | |

(Continued)

FOREIGN PATENT DOCUMENTS

| | | |
|---|---|---|
| EP | 0826481 A2 | 3/1998 |
| EP | 2888937 A1 | 7/2015 |

(Continued)

OTHER PUBLICATIONS

Extended European Search Report dated Apr. 9, 2015 for Appln. No. 14200451.4.

(Continued)

*Primary Examiner* — Marc Burgess
(74) *Attorney, Agent, or Firm* — Pillsbury Winthrop Shaw Pittman, LLP

(57) ABSTRACT

To provide a fishing rod having a flexible tip rod less prone to breakage, and desired degrees of the flexibility and strength can be obtained at a required portion of the tip rod. A fishing rod includes a tip rod made of a fiber-reinforced resin material. The tip rod is formed of a short-fiber reinforced resin material in which short fibers are dispersed in a matrix resin material, the average fiber diameter of the short fibers is 3 to 15 μm, the average fiber length of the short fibers is 0.5 to 10 mm, and the content of the short fibers is 3 to 50 wt %, and a periphery of the short-fiber reinforced resin material is at least partially covered with a prepreg sheet in which reinforced fibers are aligned and extended in one direction and impregnated with a synthetic resin.

9 Claims, 9 Drawing Sheets

(56) References Cited

U.S. PATENT DOCUMENTS

| | | | |
|---|---|---|---|
| 4,876,143 A | 10/1989 | Sugita | |
| 4,885,865 A | 12/1989 | Rumbaugh | |
| 5,076,004 A * | 12/1991 | Sunaga | A01K 87/00 43/18.1 R |
| 5,239,768 A | 8/1993 | Michishita | |
| 5,328,742 A | 7/1994 | Tukihara | |
| 5,338,604 A | 8/1994 | Yasui | |
| 5,529,731 A | 6/1996 | Bendick | |
| 5,686,155 A | 11/1997 | Suzue | |
| 5,721,030 A | 2/1998 | Okada | |
| 5,964,056 A | 10/1999 | Grice | |
| 6,088,947 A | 7/2000 | Suzue | |
| 6,106,413 A | 8/2000 | Kusumoto | |
| 6,148,558 A | 11/2000 | Ono | |
| 6,286,244 B1 | 9/2001 | Weiss | |
| 6,301,821 B1 | 10/2001 | Suzue | |
| 6,524,195 B1 * | 2/2003 | Kusumoto | A63B 53/10 43/18.5 |
| 6,601,334 B1 | 8/2003 | Ono | |
| 6,709,347 B1 * | 3/2004 | Ono | A01K 87/00 43/18.5 |
| 7,305,792 B2 * | 12/2007 | Kato | A01K 87/00 43/18.5 |
| 7,584,571 B2 | 9/2009 | Ryan | |
| 7,888,275 B2 * | 2/2011 | Ward | A61L 9/127 210/505 |
| 8,001,716 B1 * | 8/2011 | Lepage | A01K 87/00 43/18.5 |
| 2004/0200123 A1 * | 10/2004 | Whiting | A01K 87/00 43/18.5 |
| 2005/0178040 A1 | 8/2005 | Kato | |
| 2005/0223617 A1 | 10/2005 | Morita | |
| 2006/0185218 A1 | 8/2006 | Whiting | |
| 2007/0039229 A1 | 2/2007 | Wang | |
| 2010/0189963 A1 | 7/2010 | Nair | |
| 2015/0150227 A1 | 6/2015 | Noda | |
| 2015/0181849 A1 | 7/2015 | Noda | |
| 2015/0181850 A1 | 7/2015 | Noda | |
| 2016/0183505 A1 | 6/2016 | Noda | |

FOREIGN PATENT DOCUMENTS

| | | |
|---|---|---|
| FR | 2892892 A1 | 5/2007 |
| GB | 1 393 102 | 5/1975 |
| GB | 2064420 | 6/1981 |
| GB | 2249006 B | 6/1994 |
| GB | 2511905 A | 9/2014 |
| JP | 54-80372 | 6/1979 |
| JP | 58-211442 | 12/1983 |
| JP | 60-212334 | 10/1985 |
| JP | 60212334 A | 10/1985 |
| JP | 60212335 A | 10/1985 |
| JP | 06-197669 | 7/1994 |
| JP | 09-056301 | 3/1997 |
| JP | 9-248103 | 9/1997 |
| JP | 09248103 A | 9/1997 |
| JP | 2000-93559 A | 4/2000 |
| JP | 2001037378 A | 2/2001 |
| JP | 2001-190185 A | 7/2001 |
| JP | 2001-275520 A | 10/2001 |
| JP | 2002233274 A | 8/2002 |
| JP | 2003102344 A | 4/2003 |
| JP | 3511559 B2 | 3/2004 |
| JP | 3582778 B2 | 10/2004 |
| JP | 2006034292 A | 2/2006 |
| JP | 2006-101779 | 4/2006 |
| JP | 3884353 B2 | 2/2007 |
| JP | 2007-209301 A | 8/2007 |
| JP | 2007209301 A | 8/2007 |
| JP | 2009060916 A | 3/2009 |
| JP | 2009-207357 | 9/2009 |
| JP | 5155083 B2 | 2/2013 |
| KR | 100359183 | 10/2002 |
| KR | 20100126611 A | 12/2010 |

OTHER PUBLICATIONS

Japanese Office Action dated Sep. 29, 2016 for Application No. 2013-272429.
Chinese Office Action dated Jul. 18, 2016 for Application No. 201410828614.9.
Second Office Action Chinese Patent Application No. 201410828614.9 dated Feb. 13, 2017 with English translation.
Third Office Action Chinese Patent Application No. 201410828614.9 dated Jun. 28, 2017 w/English translation.
Non-final Office Action Korean Patent Application No. 10-2014-0185852 dated Jun. 12, 2017 w/English translation.
Second office Action Chinese Patent Application No. 201410688908.2 dated Jan. 12, 2017 w/English translation.
Third Office Action Chinese Patent Application No. 201410686908.2 dated Jul. 7, 2017 with English translation.
Extended European Search Report EP Application No. 14200451.4 dated Apr. 9, 2015.
Extended European Search Report EP Application No. 15201502.0 dated May 9, 2016.
Second Office Action Chinese Patent Application No. 201410830233.4 dated Apr. 25, 2017 w/English translation.
Third Office Action Chinese Patent Application No. 201410830233.4 dated Sep. 6, 2017 w/English translation.
Office Action Korean Patent Application No. 10-2014-0185844 dated Jun. 15, 2017 w/English translation.
Office Action Korean Patent Application No. 10-2015-0186205 dated Nov. 15, 2017 w/English translation.
Office Action Japanese Patent Application No. 2013-272429 dated Sep. 29, 2016 w/English translation.
English translation JP 2003-102344.
Japanese Office Action dated Sep. 29, 2016 for Appln. No. 2013-272426.
Chinese Office Action dated Sep. 1, 2016 for Appln. No. 201410830233.4.
Extended European Search Report dated Apr. 10, 2015 for Appln. No. 14200034.8.
Office Action Korean Patent Application No. 10-2014-0164944 dated Jun. 8, 2017 with English translation.
European Office Action dated Jan. 18, 2017 for Appln. No. 14195379.4.
Chinese Office Action dated Jul. 18, 2016 for Application No. 201410686908.2.
Japanese Office Action dated Oct. 13, 2016 for Application No. 2013-247568.
Extended European Search Report dated Apr. 9, 2015 for Appln. No. 14195379.4.
Office Action Korean Patent Application No. 10-2014-0185844 dated Dec. 21, 2017 w/English translation.
Office Action Korean Patent Application No. 10-2014-0185852 dated Dec. 26, 2017 w/English translation.
Office Action Korean Patent Application No. 10-2014-0164944 dated Dec. 21, 2017 w/English translation.
Office Action Chinese Patent Application No. 201510954067.3 dated Dec. 12, 2017 with English translation.
Fourth Office Action Chinese Patent Application No. 201410686908.2 dated Feb. 2, 2018 with English translation.

* cited by examiner

FISHING ROD

CROSS-REFERENCE TO RELATED APPLICATIONS

This application is based on and claims the benefit of priority from Japanese Patent Application Serial No. 2013-272429 (filed on Dec. 27, 2013), the contents of which are hereby incorporated by reference in their entirety.

TECHNICAL FIELD

The present disclosure relates to a fishing rod, more specifically, to a fishing rod having a special feature at a tip of the rod.

BACKGROUND

A common fishing rod has a prepreg wound around the body of the rod. The prepreg is reinforced fibers extended in a specific direction and impregnated with a synthetic resin. The fishing rod has a tubular structure in order to reduce the weight of the rod. However, a tip of the rod may be made solid to obtain flexibility and to prevent damage thereon when the tip portion of the rod is largely bent by fish bites. Japanese Patent Application Publication Nos. S54-80372 and H9-248103 disclose a solid tip made of a so-called fiber-reinforced resin material formed from a reinforced fiber (a carbon fiber, a glass fiber or the like) impregnated with a synthetic resin. The fiber-reinforced resin material is typically formed by pultrusion and disposed continuously from a proximal end to a distal end of the tip rod.

The above-described prior-art tip is formed from a material in which reinforced fibers are arranged continuously from the proximal end to the distal end (a continuous fiber solid body), therefore elongation of the material is dictated by the material of the selected reinforced fiber. For example, the elongation of the above mentioned carbon fiber and glass fiber is about 1.5% to 2.7% of the original total length, this means that the fiber itself does not stretch so much. Because of a low elongation of such reinforced fibers, a rigidity of the tip is relatively high and has a limited flexibility when the tip is bent. It is preferable that a tip of a rod be flexible enough to sense and see subtle fish bites and have a high strength (especially a bending strength). Some solid tip rods made of the above-described fiber-reinforced resin material require more flexibility depending on target fish types and types of fishing. More flexible tip rod made of the continuous fiber can be obtained by reducing the outer diameter of the tip rod.

A certain degree of the flexibility and strength of the tip rod is required for realize, for example, various types of actions of the tip rod. The degrees of the flexibility and strength and the positions where such flexibility and strength are imparted vary depending on a type of the action. Particularly when a proximal end of the tip rod is connected to a tubular tip-holding pole, a prescribed degree of strength is required at the connecting portion in order to enhance continuity of the action. However, if the tip rod is made too flexible, the strength is likely reduced at the connecting portion. The tip rod should have appropriate flexibility and strength (bending rigidity, torsional rigidity and the like) as described above, the above-mentioned prior art tip rod cannot satisfy this requirement.

SUMMARY

The present disclosure is intended to address the above problems. An object of the present disclosure is to provide a fishing rod having a flexible tip less prone to breakage, and desired degrees of the flexibility and strength can be obtained at a required portion of the tip.

The present disclosure is intended to address the above problems. According to one aspect of the disclosure, a fishing rod having a tip rod formed of a short-fiber reinforced resin material in which short fibers are dispersed in a matrix resin material. The average fiber diameter of the short fibers is 3 to 15 μm, the average fiber length of the short fibers is 0.5 to 10 mm, and the content of the short fibers is 3 to 50 wt %. A periphery of the short-fiber reinforced resin material is at least partially covered with a prepreg sheet in which reinforced fibers are aligned and extended in one direction and impregnated with a synthetic resin.

The above-described tip rod of the fishing rod includes the short-fiber reinforced resin material in which the short fibers (the average fiber diameter of the short fibers is 3 to 15 μm, the average fiber length of the short fibers is 0.5 to 10 mm) are dispersed in the matrix resin material. Therefore, it is possible to make the tip rod flexible and less prone to breakage. When this short-fiber reinforced resin material is compared with a continuous-fiber solid body in which reinforced fibers continuously extend from the proximal end to the distal end, the tip rod made of the short-fiber reinforced resin material is more soft and flexible. Consequently, with the above-mentioned rod, it is possible to more easily sense and see subtle fish bites. Moreover, because the short fiber is dispersed in the matrix resin, an amount of displacement allowed before breakage (fracture) is increased and such advantageous effect can be obtained even when the outer diameter is made larger for certain extent. Therefore, processing of such rod is easy, and for a joint-type fishing rod, assembling becomes easy.

In addition, the above-described tip of the fishing rod has the short-fiber reinforced resin material at least partially covered with the prepreg sheet in which the reinforced fibers are aligned in one direction and impregnated with a synthetic resin. Therefore, it is possible to obtain a required rigidity by reinforcing the short-fiber reinforced resin material by covering the periphery of the short-fiber reinforced resin material with the prepreg sheet. Moreover, it is also possible to obtain desired degrees of the flexibility and strength at a required portion of the tip rod by adequately selecting the position to provide the prepreg sheet on the periphery of the short-fiber reinforced resin material, configurations of the prepreg sheet (a type and alignment of the reinforced fibers, an impregnation amount of the resin, a number of the sheets wound around the solid body, and ply rating).

Especially when the prepreg sheet is the circumferential prepreg sheet in which the reinforced fibers are aligned and extend in the circumferential direction (zero degree with respect to the circumference direction of the tip rod), the tip rod becomes less prone to deformation. When the prepreg sheet is the oblique prepreg sheet in which the reinforced fibers are aligned at a certain degrees with the circumferential direction (for example, 45 degrees with respect to the circumference direction of the tip rod), a torsional rigidity can be increased. When the prepreg sheet is the axial-direction prepreg sheet in which the reinforced fibers are aligned in the axial direction (90 degrees with respect to the circumference direction of the tip rod), a bending rigidity can be increased. As described above, the prepreg sheet can advantageously impart a directional property to the strength by adequately setting the alignment of the fibers.

When the proximal end of the tip rod is connected to a tubular tip-holding pole, the prepreg sheet may be provided to the periphery of the connecting portion of the short-fiber reinforced resin material where is to be connected with the tip-holding pole. The strength of the connecting portion can be enhanced in this manner and the continuity of the action of the rod (a difference in the rigidity can be reduced) at this portion can be improved.

According to the aspects of the disclosure, it is possible to provide a fishing rod having a flexible tip less prone to breakage, and desired degrees of the flexibility and strength can be obtained at a required portion of the tip rod.

DESCRIPTION OF THE PREFERRED EMBODIMENTS

Figure 1:
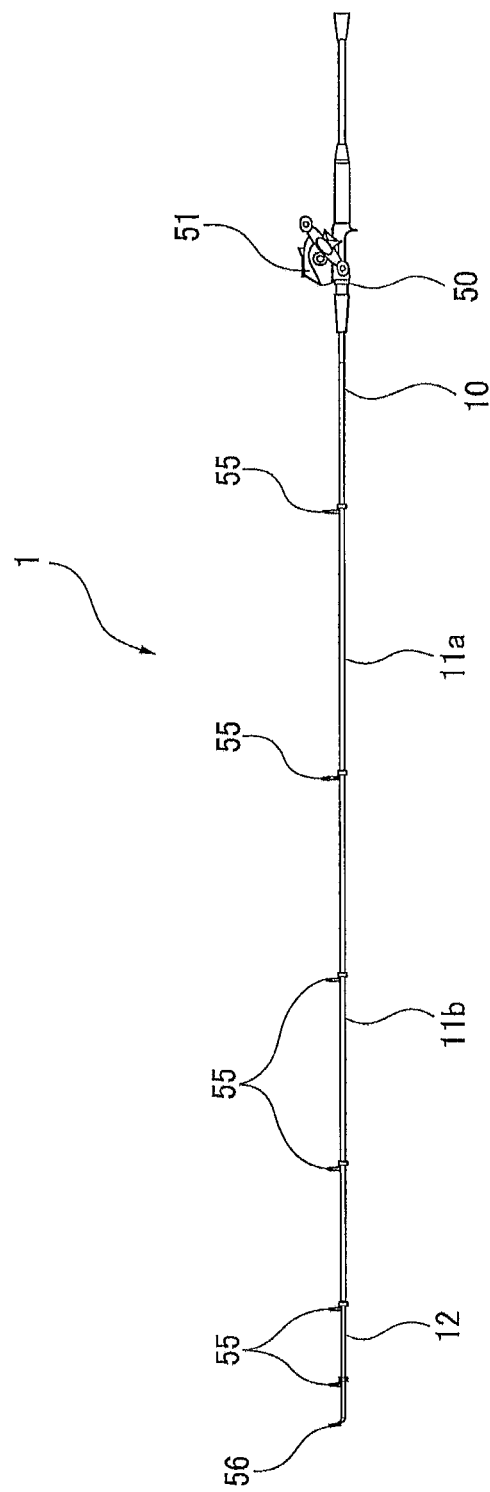
FIG. 1 is an overall view of a fishing rod according to an embodiment of the disclosure.

An embodiment of a fishing rod according to an aspect of the present disclosure will now be described with reference to the drawings. FIG. 1 is an overall view of an exemplary fishing rod according to the disclosure. A fishing rod 1 according to the embodiment is a joint-type fishing rod with external guides. The fishing rod 1 may include a butt side rod 10, more than one (two in this embodiment) intermediate rods 11a, 11b, and a tip rod 12, and they are jointed to form a telescopic fishing rod.

The butt side rod 10 and the intermediate rods 11a, 11b may be formed as tubular bodies made of a fiber-reinforced resin material in which a synthetic resin such as an epoxy resin and a polyester resin is reinforced with a reinforcement fiber such as a carbon fiber. The fishing rod 1 illustrated in FIG. 1 may have a reel seat 50 on the butt side rod 10, external guides 55 guiding a fishing line released from a reel 51 attached on the reel seat 50, and a top guide 56 with predetermined intervals therebetween. Some of the guides may be a floating type and some external guides may be omitted in some embodiments. Although the telescopic fishing rod is illustrated, the fishing rods may be ordinary or inversely jointed.

Figure 2:
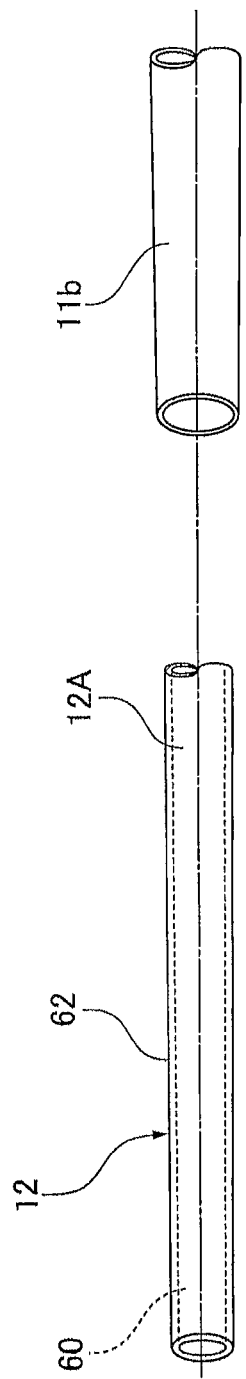
FIG. 2 is a sectional view of a tip rod of the fishing rode showing its structure.

FIG. 2 illustrates the tip rod 12 among the rods shown in FIG. 1. The tip rod 12 according to the embodiment has a solid body and a circular shape in cross-section. The tip rod 12 forms a tip portion of the fishing rod (hereunder the tip rod may also be referred to as the "tip") and is fitted into the intermediate road 11b. The tip rod 12 is made of a short-fiber reinforced resin material 60 which is a composite material in which short fibers serving as a reinforcing material are dispersed in a matrix resin (the tip rod has a solid body as described above, and therefore the "short-fiber reinforced resin material" may also be hereunder referred to as the "solid body" in the embodiment). A prepreg sheet 62 in which reinforced fibers extend in one direction and impregnated with a synthetic resin is wound around the periphery of the solid body 60 to at least partially (entirely in this embodiment) cover the solid body 60 (for example, the sheet is fixed with adhesive or the like). The solid body 60 has a fine flexibility and is less prone to breakage (cracking) when it is displaced.

The tip rod 12 illustrated in FIG. 1 has the circular sectional shape and is made as a solid body over the length. Alternatively, the tip rod may be formed to include a proximal-end side portion of a tubular body and a distal-end side portion of a solid body. In other words, the tip rod may be formed by connecting the solid distal-end portion (solid body 60) that serves as the tip and the tubular proximal-end side portion that serve as a tip-holding pole. When the fishing rod has this structure, it is possible to increase the sensitivity at a small area of the tip portion of the tip rod. Moreover, the solid portion of the tip rod may consist of a core plate such that the tip rod tends to bend in one direction. For example, when the solid portion is made in the plate form, fishing rods equipped with such tips are appropriate for fishing pond smelts and for ones with bait reels.

The prepreg sheet 62 provided to cover the periphery of the solid body 60 is a so-called fiber-reinforced polymer (FRP) in which reinforced fibers made of carbon, boron, glass, metal, ceramics and the like are impregnated with a matrix resin such as epoxy, polyester, phenol and the like. More specifically, the reinforced fibers are processed to be aligned and extend in a specific direction or to be a woven cloth, and such reinforced fibers are then impregnated with the matrix resin. The prepreg sheet 62 formed as described above is wound around the periphery of the solid body 60 to cover the solid body 60.

When the prepreg sheet 62 is a circumferential prepreg sheet in which the reinforced fibers are aligned and extend in a circumferential direction (zero degree with respect to a circumference direction of the tip rod 12), the tip rod becomes less prone to deformation. When the prepreg sheet 62 is an oblique prepreg sheet in which the reinforced fibers are aligned at a certain degrees with the circumferential direction (for example, 45 degrees with respect to the circumference direction of the tip rod 12), a torsional rigidity can be increased (in particular, the torsional rigidity against a torsional force generated at a bait rod or at the time of casting). When the prepreg sheet 62 is an axial-direction prepreg sheet in which the reinforced fibers are aligned in the axial direction (90 degrees with respect to the circumference direction of the tip rod 12), a bending rigidity can be increased.

The prepreg sheet 62 wound around the periphery of the solid body 60 may be a single sheet or include a number of sheets. In either case, the tip rod 12 includes the solid body 60 as a core and the prepreg sheet 62 wound around the solid body 60. Configurations (a type and alignment of the reinforced fibers, an impregnation amount of the resin, a number of the sheets wound around the solid body, and ply rating) of the prepreg sheet 62 wound around the solid body 60 can be adequately changed. Alternatively, a carbon tape may be obliquely wound around the solid body 60 to reinforce the solid body 60, and the same advantageous effects as the above-embodiment can be obtained.

Figure 3:
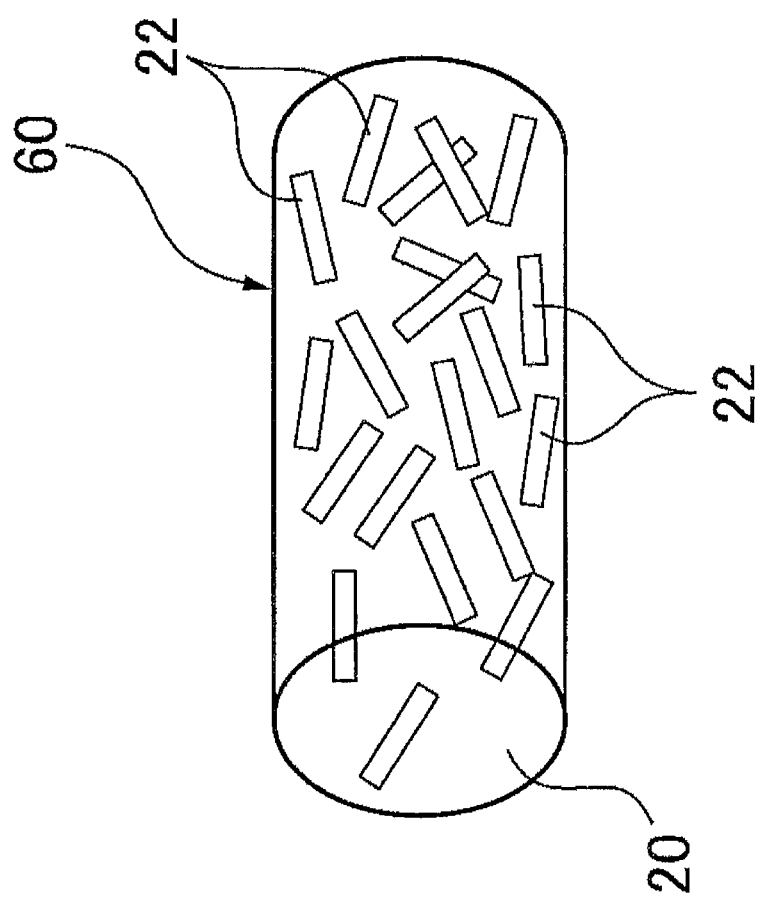
FIG. 3 schematically illustrates a state of reinforced fibers (short fibers) contained in a short-fiber reinforced resin material (solid body) that forms the tip rod.

The solid body 60 may be formed by dispersing a number of short fibers 22 serving as a reinforcing material in a matrix resin 20 as illustrated in FIG. 3. Examples of the matrix resin 20 include thermoplastic resins (for example, polyamide, polypropylene, polyphenylene sulfide, polyether imide) and thermosetting resins (for example, epoxy, phenole). The matrix resin 20 may be formed of mainly a polyamide resin and additionally other thermoplastic resin (polyester, polycarbonate or the like).

The matrix resin 20 may contain other supplemental material (other than the reinforcing material). For example, the tip rod 12 can be colored by mixing a colorant such as pigment in the matrix resin, moreover the weight of the tip rod can be reduced by foaming the matrix resin to mix microbubbles therein. Moreover, it is possible to optimize injection molding of the fiber-reinforced resin material by adding a fluidity modifier, an anti-static agent, a mold releasing agent, an antioxidant, and the like.

The reinforced fibers (the short fibers 22) dispersed in the matrix resin 20 may be, for example, carbon fibers such as PAN carbon fibers and pitch carbon fibers or glass fibers. The size of each short fiber 22 is not particularly limited. However, it is preferable that the average fiber diameter of the short fibers be 3 to 15 μm and the average fiber length of the short fibers be 0.5 to 10 mm.

The reason why the dimension of the short fibers 22 dispersed in the matrix resin 20 is set in the above-describe range is that the tip rod requires a large amount of fibers to obtain a prescribed flexibility (a flexibility or strength with a fine visual sensitivity) when the fiber diameter is smaller than 3 μm and the fiber length is shorter than 0.5 mm. If a large amount of fibers is mixed in the matrix resin, the fluidity at the time of molding is reduced and the short fibers cannot be uniformly distributed along the axial direction. Moreover, if the fiber diameter is larger than 15 μm and the fiber length is longer than 10 mm, the fluidity at the time of molding is also reduced although it is possible to set a content ratio of the fibers for obtaining a prescribed flexibility, and consequently the short fibers cannot be uniformly distributed along the axial direction.

The content of the above-described sized short fiber 22 in the matrix resin 20 is set to 3 to 50 wt %. This is because when the content of the short fibers 22 having the above-described dimension is less than 3 wt %, a sufficient strength cannot be obtained, whereas when the content of the short fibers exceeds 50 wt %, the fluidity at the time of molding is reduced even with the above-described sized short fibers, and consequently the short fibers cannot be uniformly distributed along the axial direction. Moreover, considering the requirements (the softness, flexibility, and strength) for the tip rod, such requirements would be satisfied when the content of the short fibers is less than 50 wt %.

Note that all the short fibers contained in the matrix resin 20 may not necessarily have the above-described size, some of them may be out of the above-mentioned range. In other words, as long as a large majority of the short fibers have average diameters and lengths within the above-described range, it is allowed that some short fibers have larger or smaller sizes out of the range.

The content of the short fibers 22 may not necessarily be distributed uniformly along the axial direction. For example, when the content of the short fibers 22 is increased gradually or in a stepwise fashion toward the proximal end along the axial direction, the distal end side of the tip rod can be easily bent. Alternatively, when the content of the short fibers 22 is made uniform along the axial direction and the fiber diameters are made same along the axial direction, a flexing characteristic of the tip rod becomes uniform, but by providing a taper 12A on the surface of the tip rod as the diameter of the rod decreases toward the distal end as illustrated in FIG. 2, an amount of the bend can be increased toward the distal end (the tapered portion of the tip tapering toward the distal end encompasses ones that include partially a straight portion, a large diameter portion, ones with a different tapering rate, ones tapered in a stepwise manner and the like). Moreover, when the taper is formed as illustrated in FIG. 2 on the surface of the tip rod where the content of the short fibers 22 is decreased toward the distal end, the distal end region of the tip rod can be easily bent, resulting in increased sensitivity thereon. An example of a method for changing the content of the short fibers 22 along the axial direction includes injecting fiber-reinforced resin materials with different fiber contents by using, for example, a two-color molding machine.

As for the solid body 60 made of the above-mentioned composite material, it is preferable that the short fibers 22 which serve as a reinforcing material be dispersed in the matrix resin 20 such that many of the short fibers 22 are distributed anisotropically in a radially inner region of the solid body and many of the short fibers aligned along the axial direction in a radially outer region of the solid body. More specifically, as shown in the sectional view of FIG. 4, when the short fibers are aligned along the axial direction, the sections of such short fibers become substantially circular shapes (see the short fibers 22 in the radially outer region). When the short fibers are arranged anisotropically, such the sections of short fibers tend to be oblong or ellipse as the short fibers are cut diagonally in section (see the short fibers 22' in the radially center region). In other words, it is possible to effectively enhance the bending rigidity of the solid body 60 when the short fibers in the radially outer region are aligned along the axial direction, and therefore the solid body can be configured to be flexible with a prescribed elastic force. In addition, it is possible to increase the torsional strength of the solid body 60 when the short fibers 22 are anisotropically arranged in the radially center region, and therefore it is possible to prevent breakage due to torsional stress.

Here, "many of the short fibers in the radially outer region are aligned along the axial direction" can be defined by seeing the tip rod in section (at any position) and figuring out a ratio of the short fibers 22 with circular shape sections among a large number of short fibers dispersed in the synthetic resin. More specifically, supposing that a diameter of the solid body 60 is D at a given position, if a ratio of the short fibers 22 with circular sections in the radially outer region where is outside a circle with a radius of (½)D is larger than a ratio of the short fibers 22 with circular sections inside the circle with the radius of (½)D, it can be defined that many of the short fibers 22 aligned in the axial direction are distributed in a region closer to the surface of the solid body 60. When the solid body 60 is configured in this way, it is possible to obtain a desired bending rigidity and increase the strength against torsion. The alignment of the short fibers 22 illustrated in FIG. 4 can be realized through a hereunder-described manufacturing method.

FIG. 5 illustrates various covering forms of the prepreg sheet 62 on the periphery of the solid body 60 forming the tip rod 12. FIG. 5a illustrates a covering form of the embodiment which is also shown in FIG. 2. Referring to FIG. 5a, the whole peripheral surface (over the length) of the solid body 60 is covered with the prepreg sheet 62. Here, the solid body 60 is tapered toward the distal end as the diameter of the solid body gradually decreases toward the distal end, and consequently the solid body 60 has a tapered peripheral surface 60a. Therefore, the prepreg sheet 62 wound around the solid body 60 to cover the periphery of the solid body 60 has the profile of taper where the diameter decreases gradually toward the distal end. As a result, the outline of the tip rod as a whole is tapered toward the distal end. This covering form has an advantage that it is possible to reinforce the entire tip rod including the distal end portion where can be easily twisted.

Figure 5A:
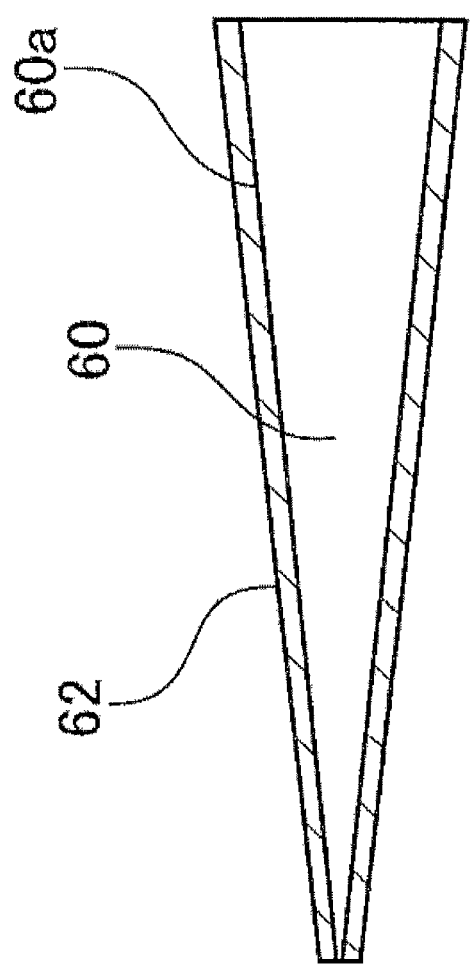
FIGS. 5a to 5d illustrate various covering forms of a prepreg sheet on the periphery of the short-fiber reinforced resin material (solid body).
Figure 5B:
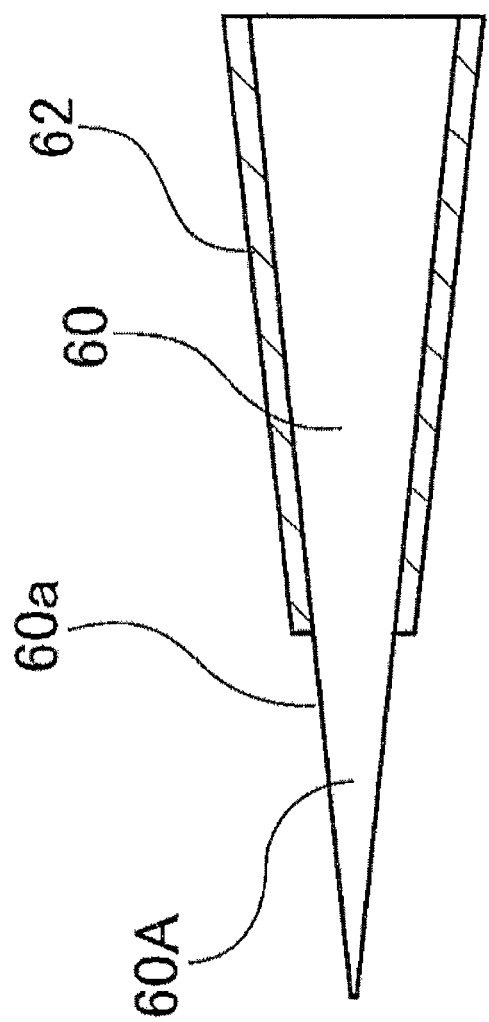

Referring to FIG. 5b, the solid body 60 and the prepreg sheet 62 (consequently, the tip rod 12) are also tapered but the solid body 60 has a portion 60A close to the distal end of the tip rod 12 is exposed from the prepreg sheet 62. This covering form has an advantage of a smooth rigidity transition throughout the tip rod without increasing the bending rigidity of the distal end portion.

Figure 5C:
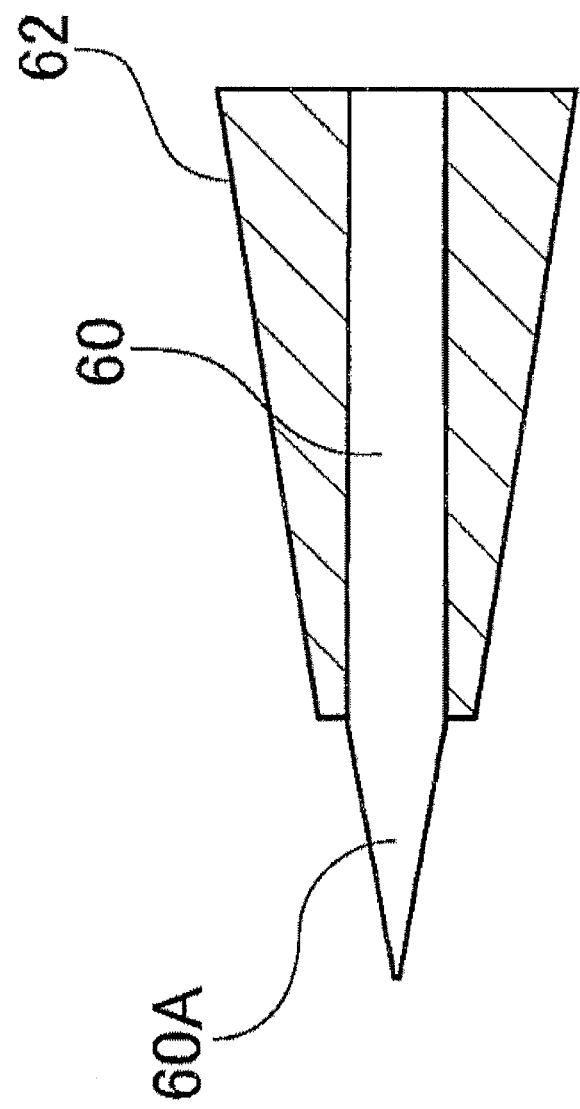

Referring to FIG. 5c, the distal-end portion 60A of the solid body 60 is exposed like the covering form shown in FIG. 5b but the solid body 60 has a straight body except for the distal-end portion 60A. The prepreg sheet 62 is tapered toward the distal end, in other words, the thickness of the prepreg sheet 62 decreases toward the distal end. This covering form has an advantage that the rigidity of the tip rod can be increased while the diameter of the tip rod can be reduced.

Figure 5D:
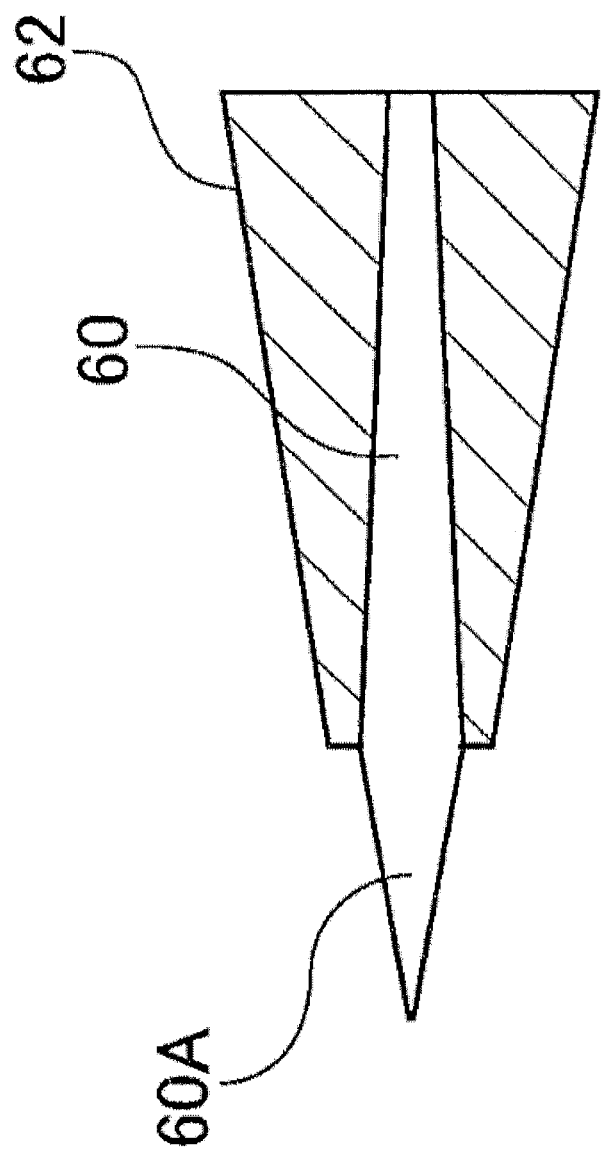

A covering form illustrated in FIG. 5d is a modification example of the covering form shown in FIG. 5c. The portion of the solid body 60 where is straight (and covered with the prepreg sheet 62) in the example shown in FIG. 5c is tapered toward the proximal end (tapered reversely to the distal-end portion 60A of the solid body 60), in other words, the diameter of the solid body 60 is decreased gradually toward the proximal end in this covering form. And the thickness of the prepreg sheet 62 is increased toward the proximal end. In this covering form, the portion of the solid body 60 where is covered with the prepreg sheet 62 may be tapered continuously as illustrated in FIG. 5d or in a step-wise manner (a straight portion may be provided at the middle) toward the proximal end, or may be tapered till the middle and may be straight thereafter. The covering form shown in FIG. 5d has an advantage that the tip rod can be made soft.

Figure 6:
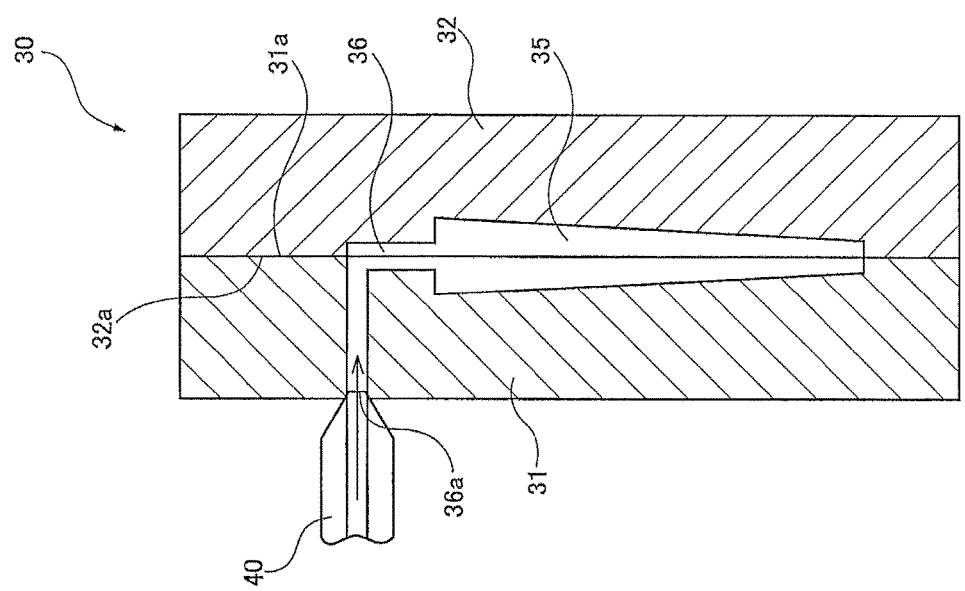
FIG. 6 illustrates an example of a mold used in a method of manufacturing the short-fiber reinforced resin material of the tip rod.

An example of a manufacturing method for the solid body 60 of the above-described tip rod 12 will be now described with reference to FIG. 6. The solid body 60 for the tip rod 12 with the taper 12A on its surface as shown in FIG. 2 can be formed by injecting a fiber-reinforced resin material that contains the above-described short fibers into a mold 30 shown in FIG. 6 to form the solid body integrally by the molding. The mold 30 in this embodiment has two mold parts 31, 32 that can be separated from each other at the time of demolding. On contact surfaces 31a, 32a of the mold parts 31, 32, a cavity 35 of which contour corresponds to the contour of the tip rod 12 is formed. The mold parts 31, 32 each has a gate 36 through which a fiber-reinforced resin is injected into a predetermined position. The gate 36 communicates with the cavity 35 and has an opening 36a extending to a side of the mold 30. A nozzle 40 of a molding machine is inserted into the opening 36a and the fiber-reinforced resin material is injected into the mold as indicated by the arrow in FIG. 6. The mold 30 is placed such the tip rod that is gradually tapered toward the distal end vertically stands and the distal end of the tip rod faces the bottom. The fiber-reinforced resin material is injected into the cavity where the distal end of the tip rod faces the bottom.

The fiber-reinforced resin material to be injected is a thermoplastic resin that contains short fibers at a content of 3 to 50 wt %. The average fiber diameter of the short fibers is 3 to 15 μm, and the average fiber length of the short fibers is 0.5 to 10 mm. The thermoplastic resin is injected at a predetermined temperature (a thermoplastic temperature of about 200° C.). The mold 30 is kept at a temperature lower than the temperature of the fiber-reinforced resin material to be injected therein. Therefore, the injected fiber-reinforced resin material is cooled and cured from its surface contacting with the inner surface of the mold 30. More specifically, the injected fiber-reinforced resin material flows along the axial direction of the tip rod 12 and therefore the short fibers included in the resin material are aligned along the axial direction with the flow. The resin material is then cured from the surface as it flows and therefore the short fibers in a region close to the surface tend to be aligned along the axial direction. However, there is some time before the resin in a region around the center of the material is cured, and even after the flow stops (the cavity has been substantially filled up with the fiber-reinforced resin material), the short fibers in that region are allowed to move freely to some extent and consequently each of the short fibers is directed differently.

Figure 4:
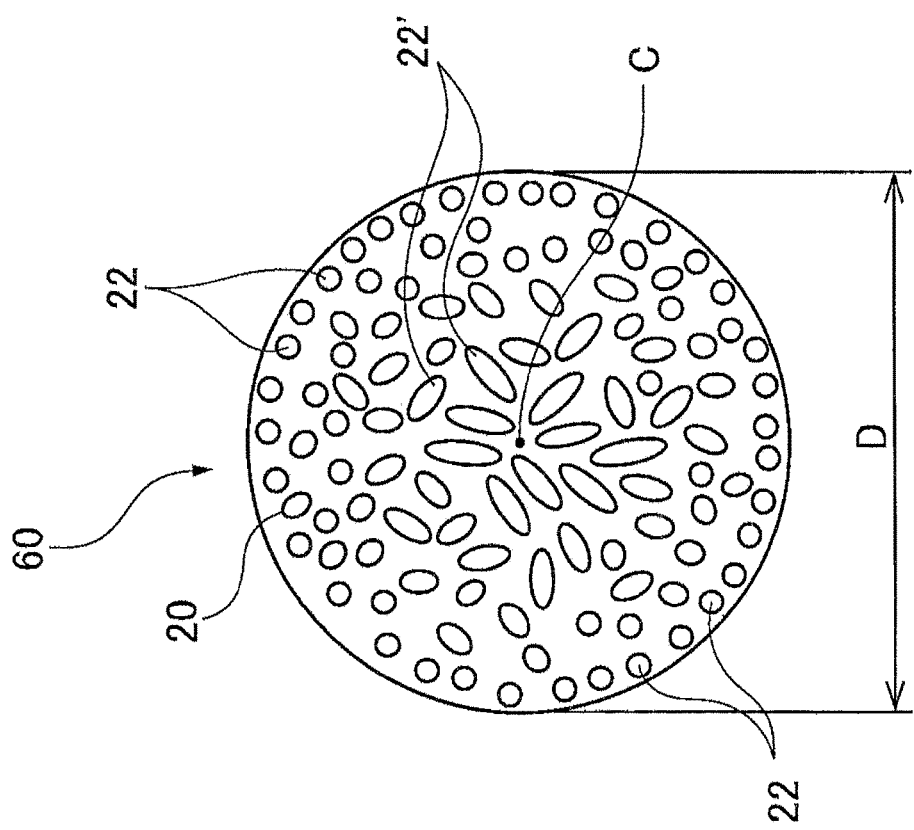
FIG. 4 is a longitudinal sectional view of the solid body.

As described above, the short fibers in the radially outer region can be aligned along the axial direction and the short fibers in the center region can be arranged anisotropically by adjusting the temperature difference between the fiber-reinforced resin material to be injected and the mold, and setting the injection direction (injecting vertically as described above). The arrangement of the short fibers as illustrated in FIG. 4 can be modified by changing an injection pressure of the fiber-reinforced resin material, the temperature difference between the mold and the resin material, the position of the gate, the number of the gates and the like.

In the embodiment, a woven prepreg containing glass fibers (an impregnation amount of a resin is preferably 30 to 80 wt %) may be provided at the interface between the solid body 60 and the prepreg sheet 62 and the interface may be enriched with the resin to prevent the separation. Alternatively, the interface regions (the outer surface or inner surface) of the solid body 60 and the prepreg sheet 62 may be processed to increase a bonding area so as to increase the bonding area. More specifically, the surface may be roughened by sandblasting or the like, the surface may be scratched (dented) in a spiral pattern, a concave portion (the shape of the concave portion can be changed by selecting a type of a grind stone) may be formed on the surface by a centerless processing and the like, concave and convex portions are formed on the surface, or a stepwise taper toward the distal end may be formed. In order to enhance the bonding (connection) strength between the solid body 60 and the prepreg sheet 62, a thread may be wounded around an outer periphery of the bonded portion between the solid body 60 and the prepreg sheet 62 to fix the prepreg sheet. Alternatively, a leg of a guide for guiding a fishing line may be fixed on the periphery of the bonding portion by winding a thread around the leg.

Moreover, in the embodiments where the solid body 60 is partially covered with the prepreg sheet 62 (see FIGS. 5b, 5c, and 5d), the solid body may have portions where two or more types of materials are used (the portion where the reinforced fibers are aligned along the axial direction and the portion where the short fibers are dispersed) on the surface in the axial direction, so that the bending characteristics differ. When paint is performed on a surface of such a tip rod, there may be problem in adhesion of the paint. To address this problem, it is preferable that a primer that enhances the adhesion be applied to at least one of the portions (preferably the portion with a larger flexure). Examples of the primer include urethane resin, acrylic resin, acrylic urethane resin, epoxy resin and the like. More particularly, it is preferable that the primer with a low hardness (soft).

The tip rod 12 according to the embodiment may also be formed by extrusion molding other than the above-described manufacturing method. When the tip rod is formed by extrusion molding, the shape of the tip rod becomes a circular cylinder so that centerless grinding can be performed onto the tip rod to obtain a desired shape.

The tip rod 12 of the fishing rod 1 according to the embodiment includes the short-fiber reinforced resin material (solid body) 60 in which the short fibers (the average fiber diameter of the short fibers is 3 to 15 µm, the average fiber length of the short fibers is 0.5 to 10 mm) are dispersed in the matrix resin. Therefore, it is possible to make the tip rod flexible and less prone to breakage. The solid body 60 includes the reinforced fibers that do not extend from the proximal end to the distal end of the tip rod, and therefore there is no limitation by the elongation of such reinforced fibers. Consequently, the solid body can be configured to be softer (less prone to snapping due to a large displacement) compared to conventional tip rods by selecting an appropriate matrix resin material. With such a soft tip rod, it is possible to improve the sensitivity to sense a fish strike and enhance a visual sensitivity (a very small displacement of the tip) and an engagement characteristic (hook will not be easily released from fish). Moreover, such a tip rod is formed with the same hardness and strength, the outer diameter of the tip rod can be increased because the elasticity is low. As a result, it is possible to improve the assembling efficiency.

In addition, the tip 12 of the fishing rod 1 according to the embodiment has the solid body 60 at least partially covered with the prepreg sheet 62 in which the reinforced fibers are aligned in one direction and impregnated with a synthetic resin. Therefore, it is possible to obtain a required rigidity by reinforcing the solid body 60 by covering the periphery of the solid body 60 with the prepreg sheet. Moreover, it is also possible to obtain desired degrees of the flexibility and strength at a required portion of the tip rod by adequately selecting the position to provide the prepreg sheet 62 on the periphery of the solid body 60, configurations of the prepreg sheet 62 (a type and alignment of the reinforced fibers, an impregnation amount of the resin, a number of the sheets wound around the solid body, and ply rating).

Especially when the prepreg sheet 62 is the circumferential prepreg sheet in which the reinforced fibers are aligned and extend in the circumferential direction (zero degree with respect to the circumference direction of the tip rod), the tip rod becomes less prone to deformation. When the prepreg sheet 62 is the oblique prepreg sheet in which the reinforced fibers are aligned at a certain degrees with the circumferential direction (for example, 45 degrees with respect to the circumference direction of the tip rod), a torsional rigidity can be increased. When the prepreg sheet 62 is the axial-direction prepreg sheet 62 in which the reinforced fibers are aligned in the axial direction (90 degrees with respect to the circumference direction of the tip rod), a bending rigidity can be increased. As described above, the prepreg sheet can advantageously impart a directional property to the strength by adequately setting the alignment of the fibers.

When the proximal end of the tip rod 12 (solid body 60) is connected to a tubular tip-holding pole, the prepreg sheet 62 may be provided to the periphery of the connecting portion of the solid body 60 where is to be connected with the tip-holding pole. The strength of the connecting portion can be enhanced in this manner and the continuity of the action of the rod (a difference in the rigidity can be reduced) at this portion can be improved.

Embodiments of the present disclosure are not limited to the above descriptions and are susceptible to various modifications. For example, although the fishing rod according to the embodiment includes more than one rod (pole) is jointed to each other to form the entire fishing rod, the fishing rod can be formed as a single body that has the above-described features. Although the sectional shape of the tip rod is circular in the above-described embodiment, the sectional shape may be a non-circular shape such as oblong. Although the short-fiber reinforced resin material is formed as the solid body in the above-described embodiment, it may be formed as a tubular body. To form the tubular body, for example, a core may be placed within the cavity 35 of the mold 30 shown in FIG. 6 in advance, the material (the fiber reinforced resin material containing short fibers) can be then casted around the periphery of the core.

What is claimed is:

1. A fishing rod, comprising:
a tip rod formed of a short-fiber reinforced resin material in which short fibers are dispersed in a matrix resin material, wherein the average fiber diameter of the short fibers is 3 to 15 µm, the average fiber length of the short fibers is 0.5 to 10 mm, and the content of the short fibers is 3 to 50 wt %, and a periphery of the short-fiber reinforced resin material is at least partially covered with a prepreg sheet in which reinforced fibers are aligned and extended in one direction and impregnated with a synthetic resin,
wherein the short fibers of the short-fiber reinforced resin material are dispersed in the matrix resin material such that in a cross section, a ratio of anisotropically arranged fibers to axially aligned fibers is greater in a radially inner region than in a radially outer region and wherein the short-fiber reinforced resin material is a singular, continuous body comprising both the radially outer region and the radially inner region with the matrix resin material cured as a singular, continuous matrix resin material comprising both the anisotropically aligned short fibers and the axially aligned short fibers in the radially inner and outer regions.

2. The fishing rod of claim 1, wherein the short-fiber reinforced resin material is made as a solid body.

3. The fishing rod of claim 1, wherein the prepreg sheet is formed as a woven fabric.

4. The fishing rod of claim 1, wherein a portion of the short-fiber reinforced resin material forming a distal-end portion of the tip rod is uncovered and exposed from the prepreg sheet.

5. The fishing rod of claim 1, wherein the tip rod is tapered toward a distal end of the tip rod.

6. The fishing rod of claim 1, wherein the short-fiber reinforced resin material is tapered toward a distal end.

7. The fishing rod of claim 1, wherein the prepreg sheet is tapered toward a distal end.

8. The fishing rod of claim 7, wherein a thickness of the prepreg sheet is decreased gradually toward the distal end.

9. The fishing rod of claim 1, wherein the short-fiber reinforced resin material is connected to a tip-holding pole to form the tip rod, and a connecting portion of the short-fiber reinforced resin material with the tip-holding pole is covered with the prepreg sheet.

* * * * *